United States Patent
Jakobsson et al.

(10) Patent No.: US 11,198,093 B2
(45) Date of Patent: Dec. 14, 2021

(54) METHOD FOR CLEANING VISCOSE PRODUCTION OFF-GASES AND CATALYSTS FOR USE IN THE METHOD

(71) Applicant: HALDOR TOPSØE A/S, Kgs. Lyngby (DK)

(72) Inventors: Niklas Bengt Jakobsson, Kågeröd (SE); Peter Bo Olsen, Hørsholm (DK); Per Aggerholm Sørensen, Kgs. Lyngby (DK); Anders Theilgaard Madsen, Copenhagen S (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 344 days.

(21) Appl. No.: 16/331,162

(22) PCT Filed: Sep. 11, 2017

(86) PCT No.: PCT/EP2017/072711
§ 371 (c)(1),
(2) Date: Mar. 7, 2019

(87) PCT Pub. No.: WO2018/065173
PCT Pub. Date: Apr. 12, 2018

(65) Prior Publication Data
US 2019/0255484 A1    Aug. 22, 2019

(30) Foreign Application Priority Data
Oct. 6, 2016 (DK) .............. PA 2016 00593

(51) Int. Cl.
| | | |
|---|---|---|
| *B01D 53/86* | (2006.01) | |
| *B01D 53/00* | (2006.01) | |
| *B01D 53/04* | (2006.01) | |
| *B01D 53/50* | (2006.01) | |
| *B01D 53/75* | (2006.01) | |
| *C01B 17/04* | (2006.01) | |
| *C01B 17/56* | (2006.01) | |
| *B01J 21/08* | (2006.01) | |
| *B01J 23/22* | (2006.01) | |
| *D01F 13/02* | (2006.01) | |

(52) U.S. Cl.
CPC ....... *B01D 53/8612* (2013.01); *B01D 53/002* (2013.01); *B01D 53/04* (2013.01); *B01D 53/501* (2013.01); *B01D 53/75* (2013.01); *B01J 21/08* (2013.01); *B01J 23/22* (2013.01); *C01B 17/0426* (2013.01); *C01B 17/0434* (2013.01); *C01B 17/56* (2013.01); *D01F 13/02* (2013.01); *B01D 2251/304* (2013.01); *B01D 2251/404* (2013.01); *B01D 2251/604* (2013.01); *B01D 2251/606* (2013.01); *B01D 2253/102* (2013.01); *B01D 2255/207* (2013.01); *B01D 2255/209* (2013.01); *B01D 2255/2027* (2013.01); *B01D 2255/20723* (2013.01); *B01D 2255/30* (2013.01); *B01D 2257/30* (2013.01); *B01D 2257/304* (2013.01); *Y02P 70/62* (2015.11)

(58) Field of Classification Search
CPC .. B01D 53/8612; B01D 53/002; B01D 53/04; B01D 53/501; B01D 53/75; B01D 2251/304; B01D 2251/404; B01D 2251/604; B01D 2251/606; B01D 2253/201; B01D 2255/20723; B01D 2255/30; B01D 2257/304; B01J 21/08; B01J 23/22; C01B 17/0426; C01B 17/434; C01B 17/56; D01F 13/02
USPC ........................................... 423/224
See application file for complete search history.

(56) References Cited

U.S. PATENT DOCUMENTS

| | | |
|---|---|---|
| 4,277,458 A | 7/1981 | Sugier et al. |
| 6,416,725 B1 | 7/2002 | Spink et al. |
| 2005/0147554 A1 | 7/2005 | Felch et al. |
| 2008/0112870 A1* | 5/2008 | Moini ............ B01J 23/34 423/237 |
| 2012/0014854 A1 | 1/2012 | Fehrmann et al. |

FOREIGN PATENT DOCUMENTS

| | | |
|---|---|---|
| CN | 101219319 A | 7/2008 |
| CN | 201115810 Y | 9/2008 |
| CN | 204107303 U | 1/2015 |
| CN | 204134460 U | 2/2015 |
| EP | 2878367 A1 | 6/2015 |

(Continued)

OTHER PUBLICATIONS

M. G. Illmer et al: "Verfahren zur Viskoseabgasreinigung", Lenzinger Berichte, Heft 59, Aug. 1, 1985 (Aug. 1, 1985), pp. 80-87. Machine translation: English (Year: 1985).*

(Continued)

*Primary Examiner* — Anita Nassiri-Motlagh
(74) *Attorney, Agent, or Firm* — Buchanan Ingersoll & Rooney P.C.

(57) ABSTRACT

A method for cleaning an off-gas from viscose production, essentially containing $H_2S$ and $CS_2$, comprises passing the gas through a catalytic reactor containing a direct oxidation type catalyst, such as $V_2O_5$ on silica, to convert $H_2S$ in the gas to elemental sulfur, $SO_2$ or mixtures thereof, either via the oxygen present in the gas or via oxygen added to the gas stream. Elemental sulfur and $SO_2$ are removed from the effluent gas from the catalytic reactor, and the unconverted $CS_2$ is recycled to the viscose production process.

5 Claims, No Drawings

(56) References Cited

FOREIGN PATENT DOCUMENTS

FR            868575 A     1/1942
WO     2015082351 A1    6/2015

OTHER PUBLICATIONS

H. Bauer et al., Air Pollution Control Equipment, © Springer-Verlag Berlin, Heidelberg 1981, Chapter 10. (Year: 1981).*
International Search Report (PCT/ISA/210) and Written Opinion (PCT/ISA/237) dated Nov. 23, 2017, by the European Patent Office as the International Searching Authority for International Application No. PCT/EP2017/072711.
Ulrich Stocker: "Abgasreinigung bei der Viskose-Herstellung und Verarbeitung," CHEM.-ING.-TECH., vol. 48, No. 10, Oct. 1, 1976 (Oct. 1, 1976), pp. 833-839.
M. G. Llmer et al. "Verfahren zur Viskoseabgasreinigung," Lenzinger Berichte, Heft 59, Aug. 1, 1985, pp. 80-87, XP055422876, Retrieved from the Internet: URL:https://www.lenzing.com/fileadmin/template/pdf/konzern/lenzinger_berichte/ausgabe_59_1985/LB_1985_12_lllmer.pdf.
Zhang, X, et al."H2S-Selective Catalytic Oxidation: Catalysts and Processes" American Chemical Society, 2014, vol. 5, pp. 1053-1067.
Office Action (Notification of the Fourth Office Action) dated Jun. 3, 2021, by the China National Intellectual Property Administration of the People's Republic of China in corresponding Chinese Patent Application No. 201780059955.6 English Translation of the Office Action Only (2 pages).

* cited by examiner

METHOD FOR CLEANING VISCOSE PRODUCTION OFF-GASES AND CATALYSTS FOR USE IN THE METHOD

The present invention relates to a method for cleaning off-gases from viscose production and catalysts for use in the method.

Viscose rayon is a fiber of regenerated cellulose; it is structurally similar to cotton but may be produced from a variety of plants such as soy, bamboo, and sugar cane. Cellulose is a linear polymer of β-D-glucose units with the empirical formula $(C_6H_{10}O_5)_n$. To prepare viscose, dissolving pulp is treated with aqueous sodium hydroxide (typically 16-19% w/w) to form "alkali cellulose", which has the approximate formula $[C_6H_9O_4—ONa]_n$. The alkali cellulose is then treated with carbon disulfide to form sodium cellulose xanthate:

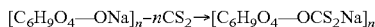

The higher the ratio of cellulose to combined sulfur, the lower the solubility of the cellulose xanthate. The xanthate is dissolved in aqueous sodium hydroxide (typically 2-5% w/w) and allowed to depolymerize to a desired extent, indicated by the viscosity of the solution. The rate of depolymerization (ripening or maturing) depends on the temperature and is affected by the presence of various inorganic and organic additives, such as metal oxides and hydroxides. Air also affects the ripening process since oxygen causes depolymerization.

Rayon fibers are produced from the ripened solutions by treatment with a mineral acid, such as sulfuric acid. In this step, the xanthate groups are hydrolyzed to regenerate cellulose and release dithiocarbonic acid that later decomposes to carbon disulfide and water:

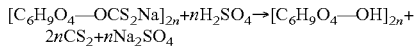

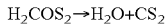

Aside from regenerated cellulose, acidification gives hydrogen sulfide, sulfur, and carbon disulfide. The thread made from the regenerated cellulose is washed to remove residual acid. The sulfur is then removed by the addition of sodium sulfide solution and impurities are oxidized by bleaching with sodium hypochlorite solution.

So in the viscose industry, there are several off-gases containing sulfur components. Streams that contain high levels of $H_2S$ are often recovered and converted to sulfuric acid which, as mentioned, is a raw material for the production of the viscose fibers. There are also gases which originate from fume collection, said gases containing less than 2% $H_2S$ and associated sulfur compounds. The level of $H_2S$ is often in the range from 200 to 2000 ppm and the $CS_2$ level around 200 to 1000 ppm. This more lean off-gas is treated in the majority of the viscose plants, which are in operation today. In the most common process, the gas is passed to a caustic scrubber (operating with NaOH), where $H_2S$ is removed from the gas phase, forming NaHS and $Na_2S$ which follow the liquid discharge.

Downstream from the scrubber, a regenerative activated carbon filter is applied, where the $CS_2$ is absorbed and concentrated in the filter bed. Then it is desorbed using a mild temperature swing process and returned, optionally after being upconcentrated, as a valuable raw material to the viscose plant. If $H_2S$ is present in the inlet gas to the activated carbon step, it will occupy the capacity of the activated carbon and disrupt the $CS_2$ recycle process which is important for the overall plant economics. This is the major reason for using a NaOH based caustic scrubber upstream from the activated carbon bed.

The $H_2S$ scrubber will use a significant excess of caustic material to catch $H_2S$ since a high pH is needed to capture $H_2S$ in such a scrubber. In the water phase, a mixture of NaHS and $Na_2S$ will be present, which is cumbersome and costly to treat in a wastewater treatment plant and also unstable with respect to release of $H_2S$ if temperature or pH is not very carefully controlled.

US 2005/0147554 A1 describes the use of a wet oxidation process to control the concentration of reduced sulfur compounds from a viscose process. The wet oxidation process oxidizes the reduced sulfur compounds to convert them to an alkali sulfate and/or thiosulfate species. The alkali sulfate stream is recycled to the viscose process. The oxidation is performed under elevated temperature and pressure conditions, such that the off-gas has an oxygen concentration between about 2% and about 18%, and the alkali sulfate stream has a pH of about 2 to 10.

In U.S. Pat. No. 6,416,725 B1, sulfurous gas streams comprising $H_2S$ and $CS_2$, such as produced as a by-product of the process of rayon-forming, are processed to recover the components in a usable form. First the gas stream is contacted with aqueous NaOH to dissolve out $H_2S$ and some of the $CS_2$. The dissolved $CS_2$ is driven off from the solution and condensed out as a liquid concentrate. Any $CS_2$ remaining in the gas stream is recovered, such as by condensation. The aqueous sodium sulfide solution, which remains from removal of $CS_2$, is concentrated and the pH is adjusted, as necessary, to a value at which the sodium sulfide is predominantly in the form of sodium bisulfide. The concentrated sodium bisulfide solution is capable of being re-used in the rayon-forming process along with the liquid concentrate of $CS_2$.

Various embodiments of waste gas recovery and adsorption systems for waste gases from viscose fiber production are described in Chinese utility model and patent applications CN 204107303 U, CN 204134460 U, CN 201115810 Y and CN 101219319 A, generally employing alkali cleaning/adsorption and condensation methods. While relevant, however, these CN applications do not anticipate the present invention.

The idea of the present invention is to use a direct oxidation type catalyst upstream from the activated carbon filter and thus convert $H_2S$ to elemental sulfur, $SO_2$ or mixtures thereof. Elemental sulfur can be removed in a condenser, and $SO_2$ is easily removed in a caustic scrubber using standard caustic agents, such as NaOH or $CaCO_3$, in a mild excess compared to the stoichiometric demand, thereby creating sulfates that can easily be handled in a liquid discharge system. Direct oxidation type catalysts comprising a catalytically active material, such as $V_2O_5$, on a support, such as silica, are known in the art and described in e.g. WO 2015/082351, U.S. Pat. No. 4,277,458 and US 2012/0014854.

More specifically, the present invention concerns a method for cleaning off-gases from viscose production, said off-gases essentially containing air and sulfur components, mainly $H_2S$ and $CS_2$, comprising the steps of
  passing the off-gas through a catalytic reactor containing a direct oxidation type catalyst to convert $H_2S$ in the off-gas to elemental sulfur, $SO_2$ or mixtures thereof, either via the oxygen present in the gas or via oxygen added to the gas stream,
  removing elemental sulfur and $SO_2$ from the effluent gas from the catalytic reactor, and recycling the unconverted $CS_2$ to the viscose production process.

The off-gas from viscose production generally contains $H_2S$ in a concentration around 200 to 2000 ppm and $CS_2$ in a concentration around 200 to 1000 ppm.

The catalytic reactor can be operated so as to convert $H_2S$ to elemental sulfur, $SO_2$ or mixtures thereof and simultaneously leave $CS_2$ substantially unconverted.

Preferably the elemental sulfur is removed in a condenser, and the $SO_2$ is removed in a caustic scrubber. The $CS_2$ is absorbed and concentrated in a regenerative activated carbon filter downstream from the caustic scrubber.

Suitable catalysts for use in the method include catalysts comprising oxides of Fe, Cr, Zn, Mn, V, Co, Ti, Bi, Sb, Cu or Mg or mixtures thereof supported on silica, alumina, titania, ceria, silicium carbide or activated carbon or mixtures thereof and optionally promoted by an alkali metal, preferably $Na_2O$. An especially preferred catalyst comprises $V_2O_5$ supported on silica.

Operation temperatures are in the range from 100 to 300° C., preferably from 160 to 260° C.

The invention claimed is:

1. A method for cleaning off-gases from viscose production, said off-gases containing air and sulfur components, including $H_2S$ and $CS_2$, comprising:

passing the off-gas through a catalytic reactor containing a direct oxidation type catalyst to convert $H_2S$ in the off-gas to elemental sulfur and $SO_2$, either via oxygen present in the gas or via oxygen added to the gas stream, removing elemental sulfur and $SO_2$ from the effluent gas from the catalytic reactor, and recycling an amount of unconverted $CS_2$ to the viscose production process, wherein the elemental sulfur is removed in a condenser and the $SO_2$ is removed in a caustic scrubber.

2. The method according to claim 1, wherein the $CS_2$ is absorbed and concentrated in a regenerative activated carbon filter downstream from the caustic scrubber, and the absorbed $CS_2$ is desorbed and returned as a raw material to a viscose production plant.

3. The method according to claim 2, wherein the absorbed $CS_2$ is desorbed and returned, optionally after being upconcentrated, as a raw material to the viscose production plant.

4. The method according to claim 1, wherein the off-gas from viscose production contains $H_2S$ in a concentration of 200 to 2000 ppm and $CS_2$ in a concentration of 200 to 1000 ppm.

5. The method according to claim 1, wherein the operation temperature of the catalytic reactor is in the range from 100 to 300° C.

* * * * *